(12) United States Patent
Fan

(10) Patent No.: US 11,162,600 B2
(45) Date of Patent: Nov. 2, 2021

(54) BUTTERFLY VALVE

(71) Applicant: JDV CONTROL VALVES CO., LTD., Taoyuan (TW)

(72) Inventor: Yi-Ming Fan, Taoyuan (TW)

(73) Assignee: JDV CONTROL VALVES CO., LTD., Taoyuan (TW)

(*) Notice: Subject to any disclaimer, the term of this patent is extended or adjusted under 35 U.S.C. 154(b) by 137 days.

(21) Appl. No.: 16/454,899

(22) Filed: Jun. 27, 2019

(65) Prior Publication Data

US 2020/0240538 A1    Jul. 30, 2020

(30) Foreign Application Priority Data

Jan. 29, 2019    (TW) ................................ 108103242

(51) Int. Cl.
| | | |
|---|---|---|
| *F16K 27/02* | (2006.01) | |
| *F16K 1/20* | (2006.01) | |
| *F16K 1/226* | (2006.01) | |

(52) U.S. Cl.
CPC ............ *F16K 27/0218* (2013.01); *F16K 1/20* (2013.01); *F16K 1/2042* (2013.01); *F16K 1/226* (2013.01)

(58) Field of Classification Search
CPC ........ F16K 27/0218; F16K 1/224; F16K 1/22; F16K 1/32; F16K 1/226; F16K 1/20; F16K 1/2042

USPC .................. 251/305–308, 286–288; 123/337
See application file for complete search history.

(56) References Cited

U.S. PATENT DOCUMENTS

| | | | | |
|---|---|---|---|---|
| 2,059,687 A | * | 11/1936 | Gagg ........................ | F02D 9/10 251/286 |
| 3,498,584 A | * | 3/1970 | Bowers .................... | F16K 1/226 251/305 |
| 5,388,807 A | * | 2/1995 | Habicht ................. | F16K 1/2263 251/305 |
| 7,552,710 B2 | * | 6/2009 | Lancioni .............. | F02M 35/108 123/336 |

* cited by examiner

*Primary Examiner* — John Bastianelli
(74) *Attorney, Agent, or Firm* — Muncy, Geissler, Olds & Lowe, P.C.

(57) ABSTRACT

A butterfly valve includes a valve body, a stem, a disc, and a stopper. The valve body has a first through hole, a second through hole and a flange. An axial central line of the second through hole and an axial central line of the first through hole are perpendicular to each other. The flange radially extends from a surface surrounding the first through hole and extends into an inner side of the first through hole. The stem is accommodated inside the second through hole and extends into the first through hole. The disc is formed on a surface thereof with a first engaging portion while the stopper is formed with a second engaging portion. The first engaging portion and the second engaging portion are respectively embedded with a first part and a second part of the stem. The stopper is rotated by the stem and abuts against the flange when the disc closes an open end of the first through hole and continues to rotate.

20 Claims, 21 Drawing Sheets

BUTTERFLY VALVE

TECHNICAL FIELD

The present disclosure relates to a butterfly valve, and particularly to a butterfly valve having a disc stopping structure.

DESCRIPTION OF THE PRIOR ART

As shown in FIG. 1A and FIG. 1B, a well-known butterfly valve 10 is a common fluid valve containing a valve body 101 formed with an inner valve chamber, a valve seat 102 placed inside the valve chamber, a rotatable disc 103 placed inside the valve seat 102, a stem 104 passing through the valve body 101 and the disc 103, and a cover 105 mounted onto the valve body 101 to fix the valve seat 102. The stem 104 is driven to rotate and bring the disc 103 to rotate, by which the sealing level between the disc 103 and the valve seat 102 can be controlled and the goal to open and close the valve chamber can be achieved.

However, during the process in which the disc 103 rotates and gradually closes to the valve seat 102, the contact friction is created between the disc 103 and the valve seat 102 and, in the end, when an over rotation of the disc 103 happens after the disc 103 completes a sealing with the valve seat 102, the contact friction causes excessive wear on the valve seat 102 and leads to a need for a greater force to re-open the disc 103. To solve this problem, a proposed solution is to form a stopper 106 on a wall surface facing the valve chamber of the valve body 101 and neighboring the sealing contact of the valve seat 102 and the disc 103 and to enable the stopper 106 to block a continuing rotation of the disc 103 after the disc 103 completes the sealing with the valve seat 102. However, the stopper 106 is conventionally one-piece casted on the valve body 101 and designed to have a certain volume growing as the size of the valve body 101 increases in order to bear the impact brought by the disc 103. In this way, the casted stopper 106 will cause obstruction during the grinding and polishing of the valve chamber, thereby leading to a low polishing efficiency. On the other hand, the stopper 106 is positioned in the middle of the fluid channel, thereby causing obstruction to the flow of the fluids passing through, and the suspended matters in the fluids are easily accumulated onto the stopper 106 and furthermore increase the severity of the flow obstruction.

Therefore, how to discard the use of this conventional stopper 106 while avoid an over sealing between the disc 103 and the valve seat 102 to prevent the valve seat 102 from being excessive worn and optimize the opening force for the disc 103 is the technical issue that the present disclosure tends to solve.

SUMMARY

In view of the above issues, a butterfly valve having an innovative disc-rotating structure is disclosed in the present disclosure.

In one embodiment, the disclosed butterfly valve includes a valve body, a stem, a disc, and a stopper. The valve body is formed with a first through hole, a second through hole, and a flange; an axial central line of the second through hole and an axial central line of the first through hole are perpendicular to each other; the flange radially extends from a surface surrounding the first through hole and extends into the first through hole. The disc is rotatable and pivoted at an open end of the first through hole to close the open end when an axial central line of the disc is in parallel with the axial central line of the first through hole. The stem is accommodated inside the second through hole and embedded in a first engaging portion formed on a surface of the disc to drive the disc to rotate. The stopper is formed with a second engaging portion which is to be embedded with the stem near the flange, and the stopper is rotated by the stem and abuts against the flange when the disc closes the open end of the first through hole and continues to rotate.

In one embodiment, the second engaging portion and the stem have an identical cross-section profile. Optionally, the cross-section profile of the second engaging portion is formed to have a shape of one selected from a group consisting of a triangle, a rectangle, a curved sawtooth, and a petal.

In one embodiment, the stopper abuts against the flange with a curved or flat surface.

In one embodiment, the stopper abuts against the flange with a ridge.

In one embodiment, the stopper abuts against the flange with a portion having a bottom edge being lower than an inner edge of the flange.

In one embodiment, the stopper and the disc are one-piece formed.

In one embodiment, the stopper abuts against the flange when the disc closes the open end and continues to rotate with an angle ranging from 0.5 degrees to 1.5 degrees.

In one embodiment, the stopper has a protruding portion formed on one side of the second engaging portion and the protruding portion abuts against the flange when the disc closes the open end and continues to rotate.

Alternatively, in another embodiment, a disclosed butterfly valve includes a valve body, a stem, a disc, and a stopper. The valve body is formed with a first through hole, a second through hole, and a flange; an axial central line of the second through hole and an axial central line of the first through hole are perpendicular to each other; the flange radially extends from a surface surrounding the first through hole and extends into the first through hole. The stem is accommodated inside the second through hole and extends into the first through hole. The disc has a first engaging portion formed on a surface opposite an open end of the first through hole, the first engaging portion is embedded with a first part of the stem, and the disc is rotated at the open end of the first through hole by the stem and closes the open end when an axial central line of the disc is in parallel with the axial central line of the first through hole. The stopper has a second engaging portion and a protruding portion extending from one side of the second engaging portion, the second engaging portion is embedded with a second part of the stem near the flange, the stopper is rotated by the stem and the protruding portion abuts against the flange when the disc continues to rotate toward the flange with an angle ranging from 0.5 degrees to 1.5 degrees from a state in which the axial central line of the disc is in parallel with the axial central line of the first through hole.

In another embodiment, the first engaging portion is formed with a third through hole and an axial central line of the third through hole coincides with the axial central line of the second through hole.

In another embodiment, the second engaging portion is formed with a fourth through hole and an axial central line of the fourth through hole coincides with the axial central line of the third through hole.

In another embodiment, the second engaging portion and the second part of the stem have an identical cross-section profile.

In another embodiment, the cross-section profile of the second engaging portion is formed to have a shape of one selected from a group consisting of a triangle, a rectangle, a curved sawtooth, and a petal.

In another embodiment, the second engaging portion and the first engaging portion have an identical cross-section profile.

In another embodiment, a surface of the protruding portion facing the flange is entirely flat and contacts the flange once the protruding portion abuts against the flange.

In another embodiment, a bottom edge of the entirely flat surface is lower than an inner edge of the flange.

In another embodiment, a surface of the protruding portion facing the flange includes a curved portion and only the curved portion contacts the flange once the protruding portion abuts against the flange.

In another embodiment, a bottom edge of the curved portion is lower than an inner edge of the flange.

In another embodiment, the stopper and the disc are one-piece formed and the second engaging portion and the first engaging portion are one-piece formed.

Summing up the above, each of the disclosed butterfly valves according to each embodiment and its variation of present disclosure has a disc-rotating structure being different from the prior arts. Specifically, in a process for the disc of the disclosed butterfly valve to seal the valve seat on the valve body, the rotation of the disc will be stopped due to the contact of the stopper with the flange. This stop ensures that the sealing level is not over, the valve body would not wear outs, and the force to reopen the disc can be optimized.

In order to make the above characteristic and advantage of the present disclosure more understandable, the embodiments are given below, and the drawings are accompanied therewith to provide a more detailed explanation.

DETAILED DESCRIPTION OF THE EMBODIMENTS

The structure, performing effect and advantages of the butterfly valve according to the present disclosure will be described below in detail with reference to the accompanying drawings and preferred embodiments of the butterfly valve according to the present disclosure.

Figure 1A:
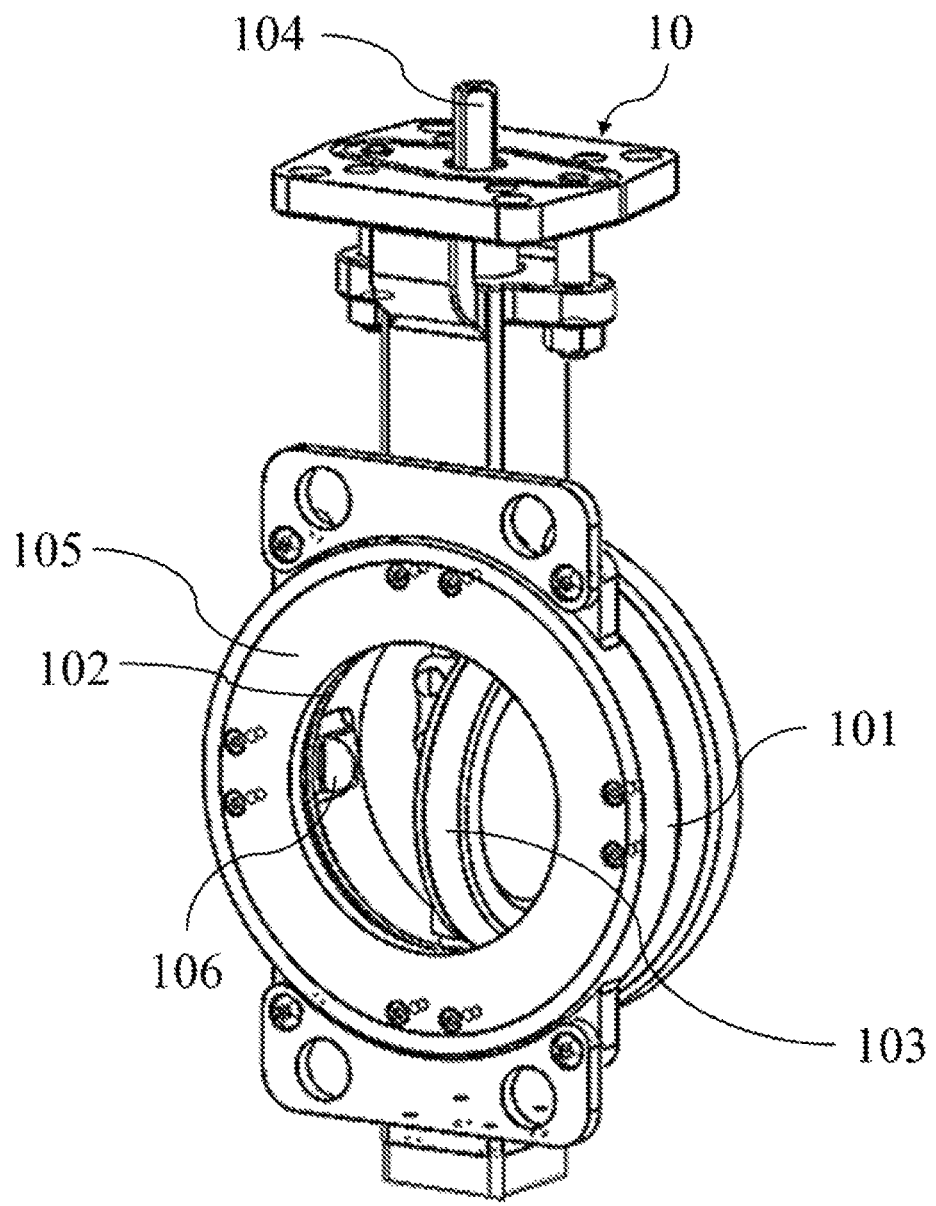
FIG. 1A is a perspective view schematically showing front of a well-known butterfly valve.
Figure 1B:
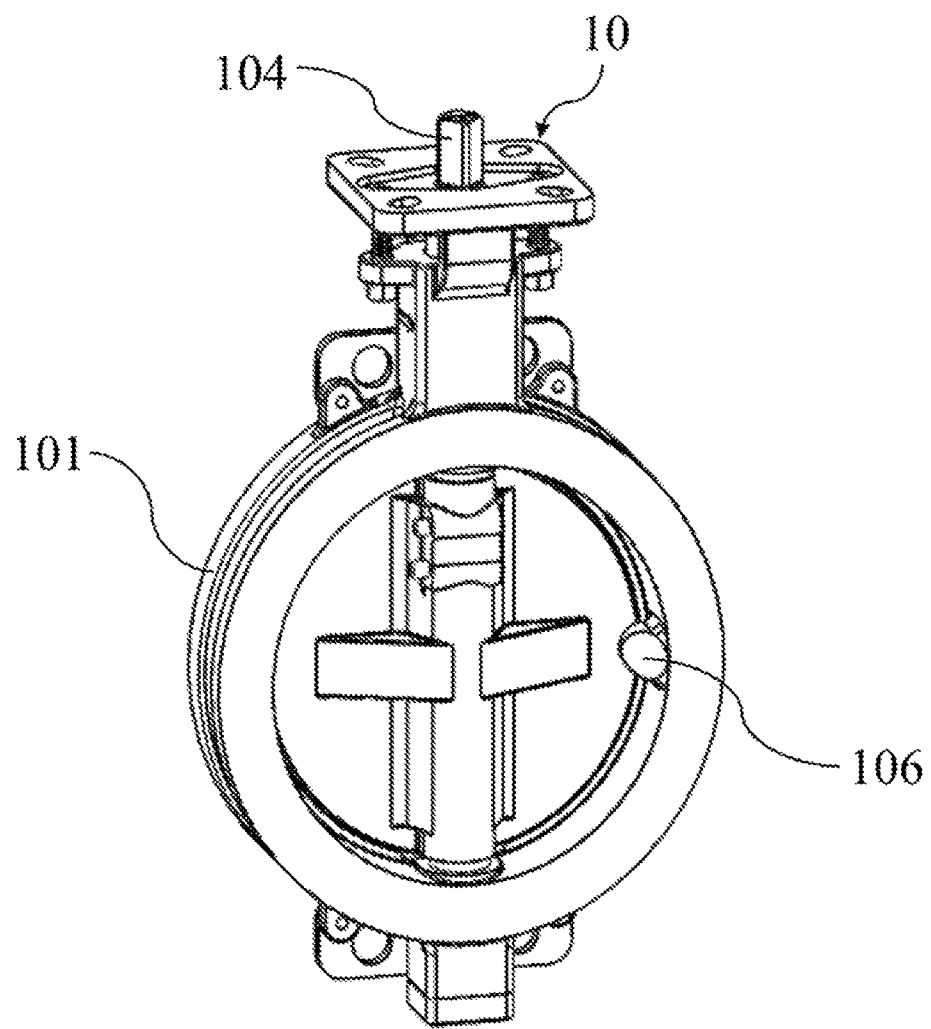
FIG. 1B is a perspective view schematically showing rear of the butterfly valve in FIG. 1A.
Figure 2A:
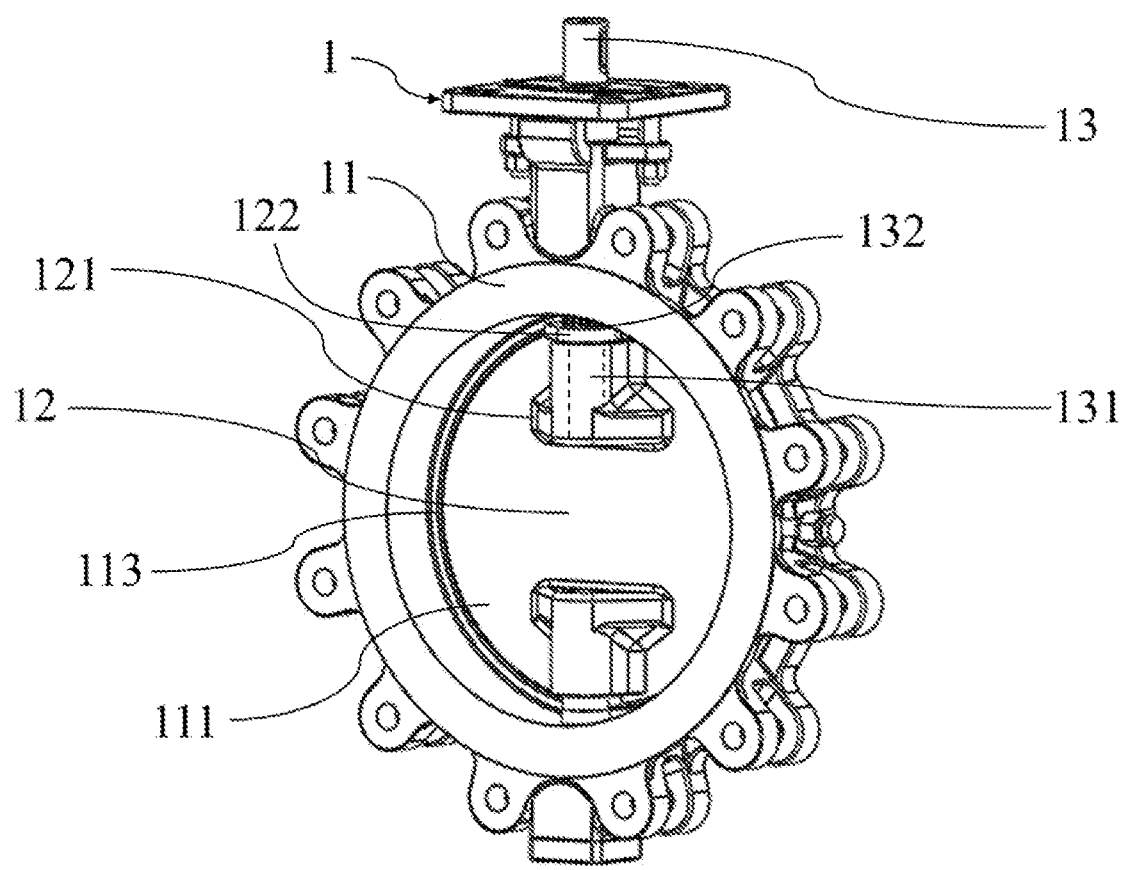
FIG. 2A is a perspective view schematically showing the butterfly valve including the valve body, the disc, the stem, and the stopper according to a first embodiment of the present disclosure.
Figure 2B:
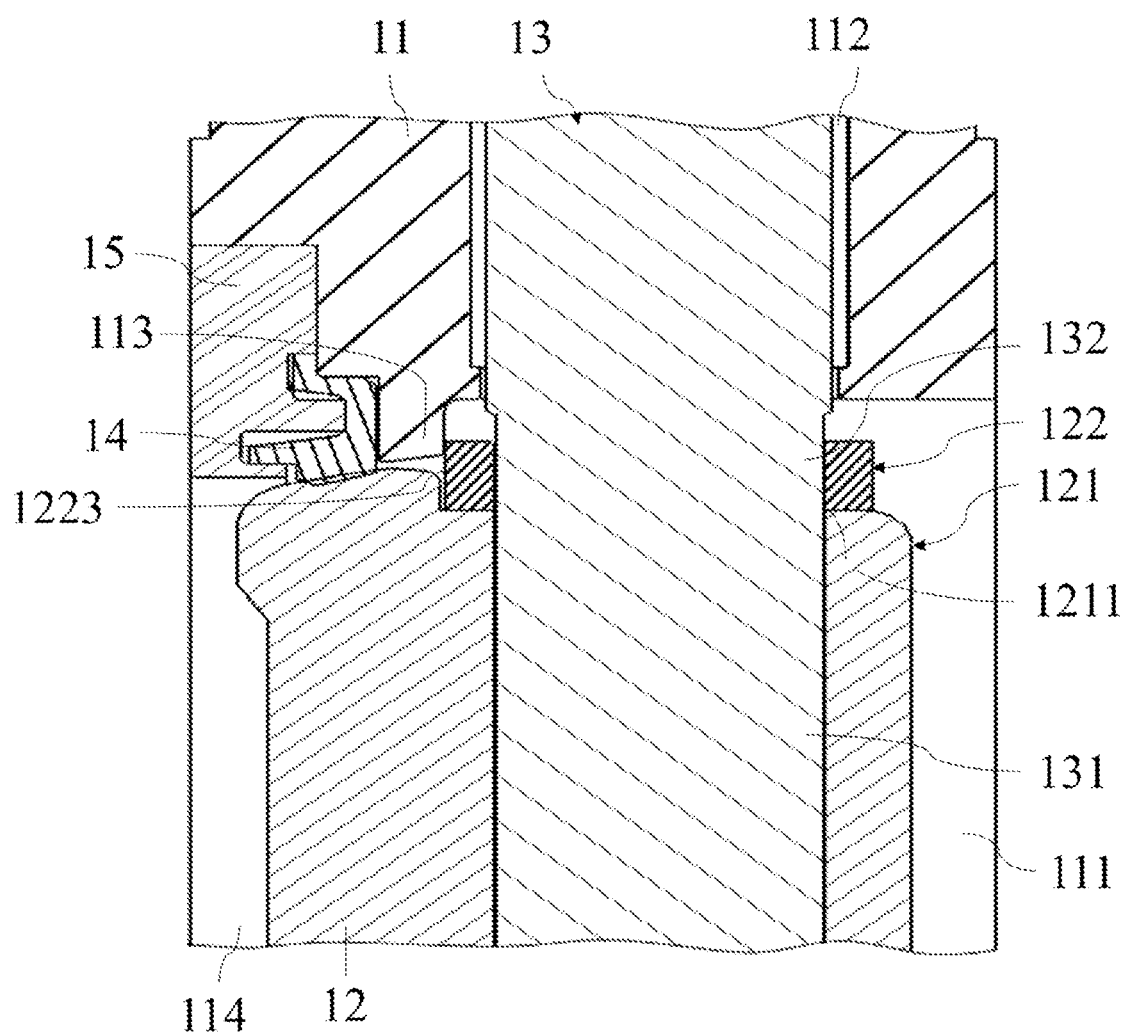
FIG. 2B is a cross-section view schematically showing a cross-section of the valve body, the disc, the stem, and the stopper of the butterfly valve according to the first embodiment of the present disclosure.

FIG. 2A is a perspective view schematically showing the butterfly valve including the valve body, the disc, the stem, and the stopper according to a first embodiment of the present disclosure. FIG. 2B is a cross-section view schematically showing a cross-section of the valve body, the disc, the stem, and the stopper of the butterfly valve according to the first embodiment of the present disclosure. FIG. 2E is a perspective view schematically showing the stem, the stopper, and the first engaging portion of the butterfly valve in FIG. 2B. Simultaneously referring to FIG. 2A and FIG. 2B, in a first embodiment, the butterfly valve 1 contains a valve body 11 formed inside with a first through hole 111, a rotatable disc 12 disposed inside the valve body 11, and a stem 13 penetrates through the valve body 11 and is embedded in the disc 12. The first through hole 111 forms to be the valve chamber of the valve body 11. The valve body 11 also contains a second through hole 112, and an axial central line of the first through hole 111 (i.e. the horizontal direction shown in FIG. 2B) and an axial central line of the second through hole 112 (i.e. the vertical direction shown in FIG. 2B) are perpendicular to each other. The stem 13 is accommodated inside the second through hole 112 and extends into the first through hole 111. The stem 13 can penetrate through the first through hole 111, from an end of the valve body 11 to the other end of the valve body 11, or, as shown in FIG. 2A, not penetrate through the first through hole 111. One surface of the disc 12 which is on the back side of or opposite to an open end 114 of the first through hole 111 is disposed with a first engaging portion 121. The first engaging portion 121 contains a third through hole 1211, and an axial central line of the third through hole 1211 and the axial central line of the second through hole 112 coincides. The stem 13 penetrates the third through hole 1211 in the first through hole 111, and the first engaging portion 121 is embedded with a first part 131 of the stem 13. In other words, the stem 13 is mounted onto a surface of the disc 12, and the stem 13 drives the disc 12 to rotate. The stem's 13 rotation causes the disc 12 to rotate in the open end 114 of the first through hole 111 and to close the open end 114 when the disc's 12 axial central line is in parallel with the axial central line of the first through hole 111. In other words, the disc 12 can be rotatively pivoted at the open end 114 of first through hole 111 and close the open end 114 when the axial central line of the disc 12 is in parallel with the axial central line of the first through hole 111. When the open end 114 is closed, the disc 12 seals the valve seat 14 which is mounted on the valve body 11 by the valve seat cover 15. The details of the well-known structure of the mentioned valve body 11, the disc 12 and the stem 13 would not be given below. The following only describes and explains the difference between the first embodiment of the present disclosure and the prior art.

Figure 2C:
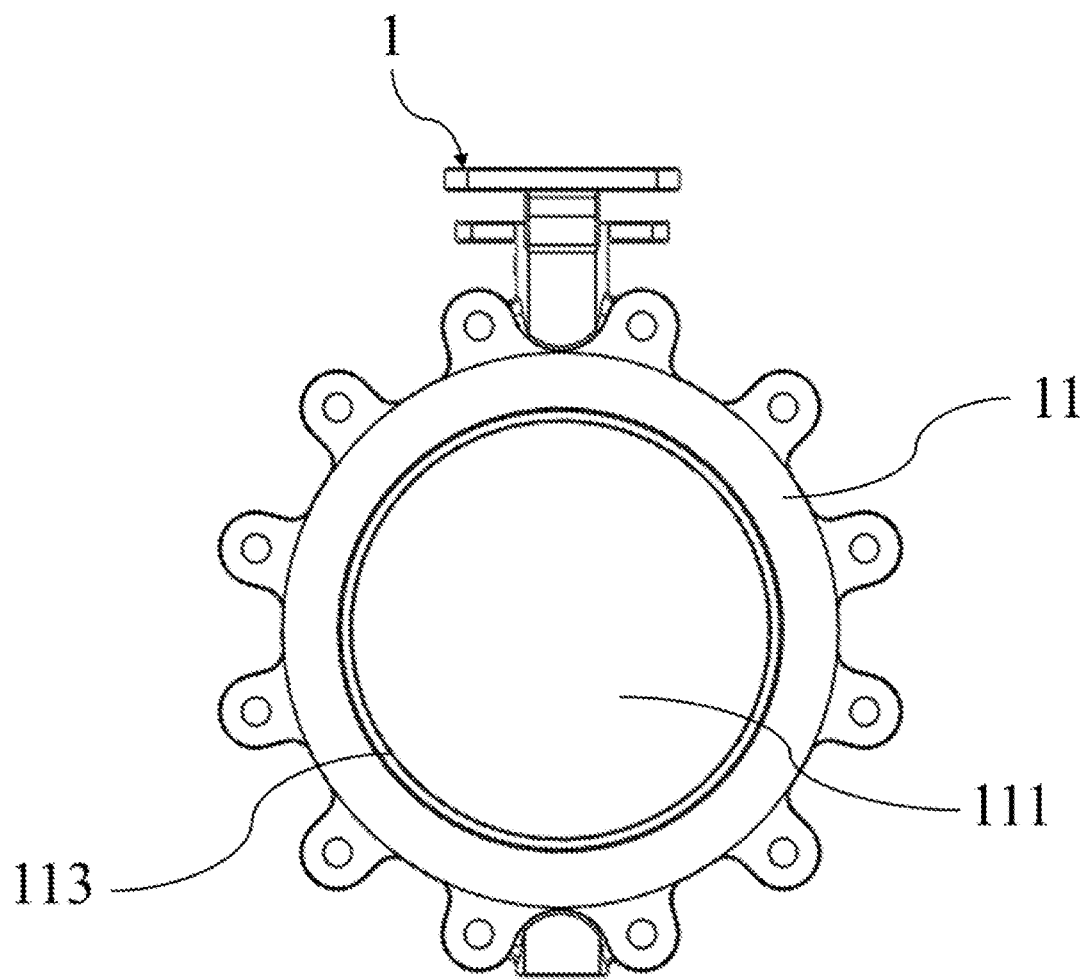
FIG. 2C is a rear view schematically showing the butterfly valve including only the valve body according to the first embodiment of the present disclosure.
Figure 2D:
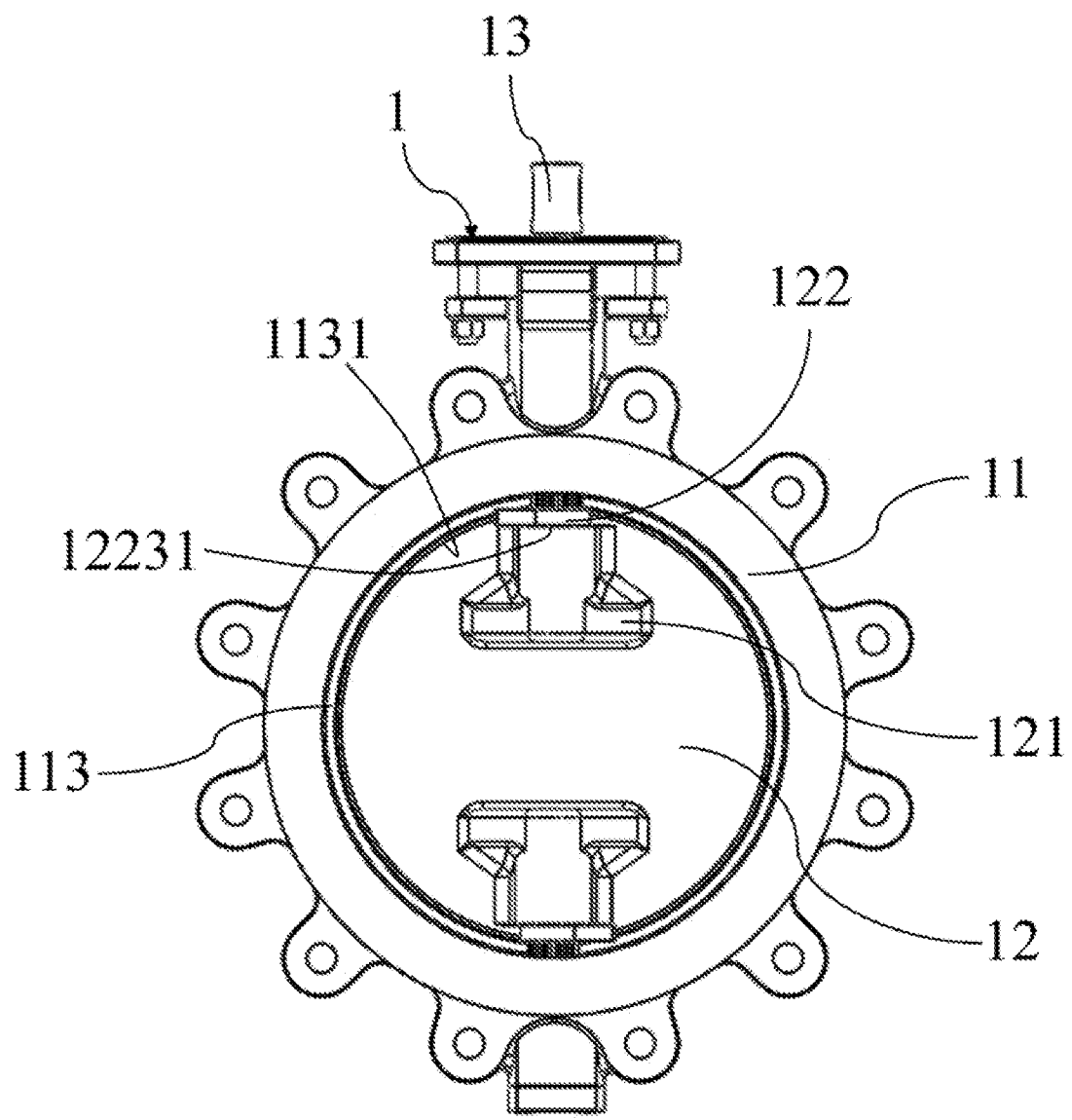
FIG. 2D is a rear view of the butterfly valve including only the valve body, the disc, the stem, and the stopper according to the first embodiment of the present disclosure.
Figure 2E:
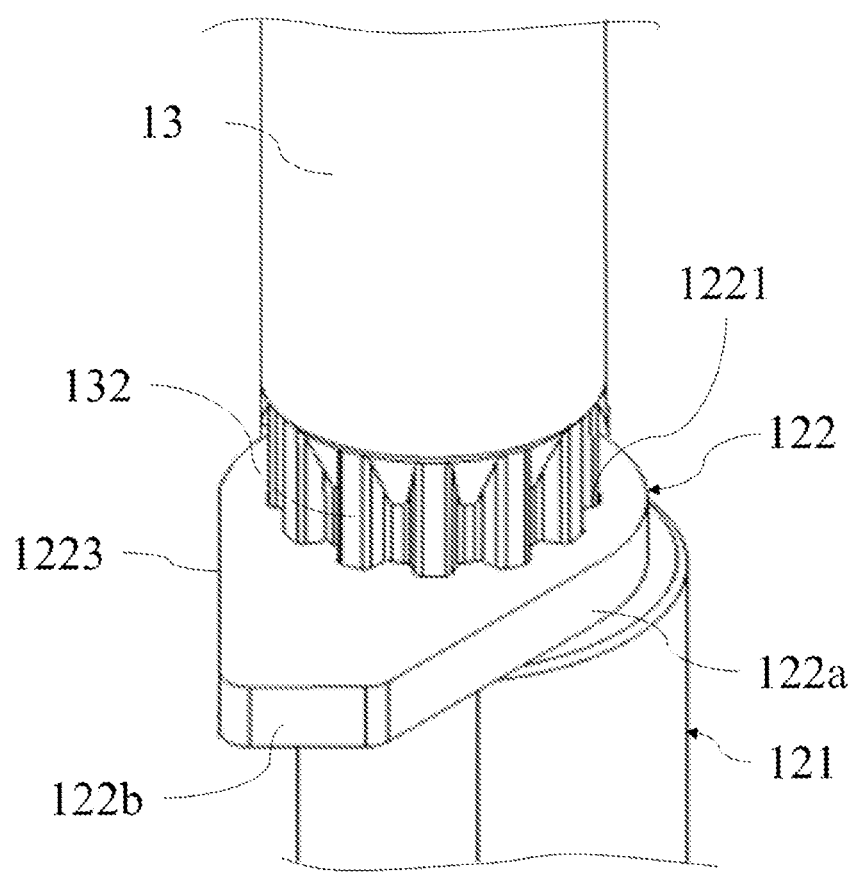
FIG. 2E is a perspective view schematically showing the stem, the stopper, and the first engaging portion of the butterfly valve in FIG. 2B.

FIG. 2C is a rear view schematically showing the butterfly valve including only the valve body according to the first embodiment of the present disclosure. FIG. 2D is a rear view of the butterfly valve including only the valve body, the disc, the stem and the stopper according to the first embodiment of the present disclosure. Referring to FIG. 2A to FIG. 2E, in one embodiment, the valve body 11 further has a flange 113 which radially extends from a surface surrounding the first through hole 111 and extends into the first through hole 111. The butterfly valve 1 also has a stopper 122 which is formed with a second engaging portion 122*a* and a protruding portion 122*b*, the protruding portion 122*b* is formed on and extended from one side of the second engaging portion 122*a*. The second engaging portion 122*a* is formed with a fourth through hole 1221, and an axial central line of the fourth through hole 1221 coincides with the axial central line of the third through hole 1211, and the stem 13 penetrates through the fourth through hole 1221 around the flange 113, and the second engaging portion 122*a* is embedded with a second part 132 of the stem 13 near the flange 113. The stopper 122 is rotated by the stem 13, and the protruding portion 122*b* abuts against the flange 113 when the axial central line of the disc 12 rotates from being in parallel with the axial central line of the first through hole 111 toward the flange 113 with a certain angle. The certain angle ranges from 0.5 degrees to 1.5 degrees. In other words, the stopper 122 abuts against the flange 113 when the disc 12 closes the open end 114 and continues to rotate. In this way, during the process in which the disc 12 closes the valve seat 14 on the valve body 11, the continuing rotation of the disc 12 will be stopped due to the contact between the flange 113 and the protruding portion 122*b* of the stopper 122 (which is hereinafter called as stopping effect), to ensure that the sealing level is not over, excessive wear of the valve seat 14 is prevented, and the applied force to reopen the disc 12 is optimized.

As shown in FIG. 2D, the butterfly valve 1 may contain two stoppers 122 placed on the two opposite ends of the disc 12 near the flange 113. Therefore, the rotation of the stem 13 will cause the two stoppers 122 to rotate along with the disc 12, and the protruding portions 122*b* of the two stoppers 122 respectively abut against the opposite ends, such as the upper end and the lower end shown in FIG. 2D, of the flange 113 when the axial central line of the disc 12 rotates from being in parallel with the axial central line of the first through hole 111 toward the flange 113 with an angle ranging from 0.5 degrees to 1.5 degrees. Referring to FIG. 2A, FIG. 2B, FIG. 2E, and FIG. 2D, in one embodiment, the first engaging portion 121 disposed on the surface of the disc 12 which is on the back side of the open end 114 of the first through hole 111 is formed to be a triangular socket. In this way, the stopper 122 can be disposed to be adjacent to the first engaging portion 121, as shown in FIG. 2B and FIG. 2E, or the stopper 122 can be disposed to be at a distance from the first engaging portion 121 (not shown). Whether the stopper 122 is required to be adjacent to the first engaging portion 121 depends on whether the location of the first engaging portion 121 is disposed adjacent to the flange 113.

Referring to FIG. 2A and FIG. 2B and FIG. 2E, in the first embodiment, the first part 131 of the stem 13 is embedded in the first engaging portion 121 and the second part 132 of the stem 13 is embedded in the second engaging portion 122*a*. With this arrangement, the stem 13 and the disc 12 do not relatively move with respect to each other as the stem 13 penetrates through the third through hole 1211, and which enables the disc 12 to rotate together with the stem 13. Meanwhile, the stem 13 and the stopper 122 do not relatively move with respect to each other as the stem 13 penetrates through the fourth hole 1221, and which enables the stopper 122 to rotate together with the stem 13. Accordingly, the disc 12 and the stopper 122 rotate together with the stem 13. In one embodiment, the second engaging portion 122*a* and the second part 132 of the stem 13 have identical cross-section profile, such as a shape of, triangle, rectangle, curved sawtooth or petal. The second engaging portion 122*a* and the first engaging portion 121 may also have identical cross-section profile, such as a shape of, triangle, rectangle, curved sawtooth or petal. If the disc 12 and the stopper 122 can precisely rotate together with the stem 13, the way of engaging the stem 13, the disc 12, and the stopper 122 is not limited herein.

As shown in FIG. 2E., in one embodiment, the cross-section profile of the second engaging portion 122*a* and the second part 132 of the stem 13 have a shape of a curved sawtooth, and the cross-section profile of the first engaging portion 121 and the first part 131 of the stem 13 also have a shape of a curved sawtooth. The curvature, amount and arrangement of the curved sawtooth depend on the actual size and design needs of the stem 13, the stopper 122 and the disc 12 and are not limited herein. For example, a plurality of curved sawtooth may be equidistantly arranged as shown in FIG. 2E.

Figure 3A:
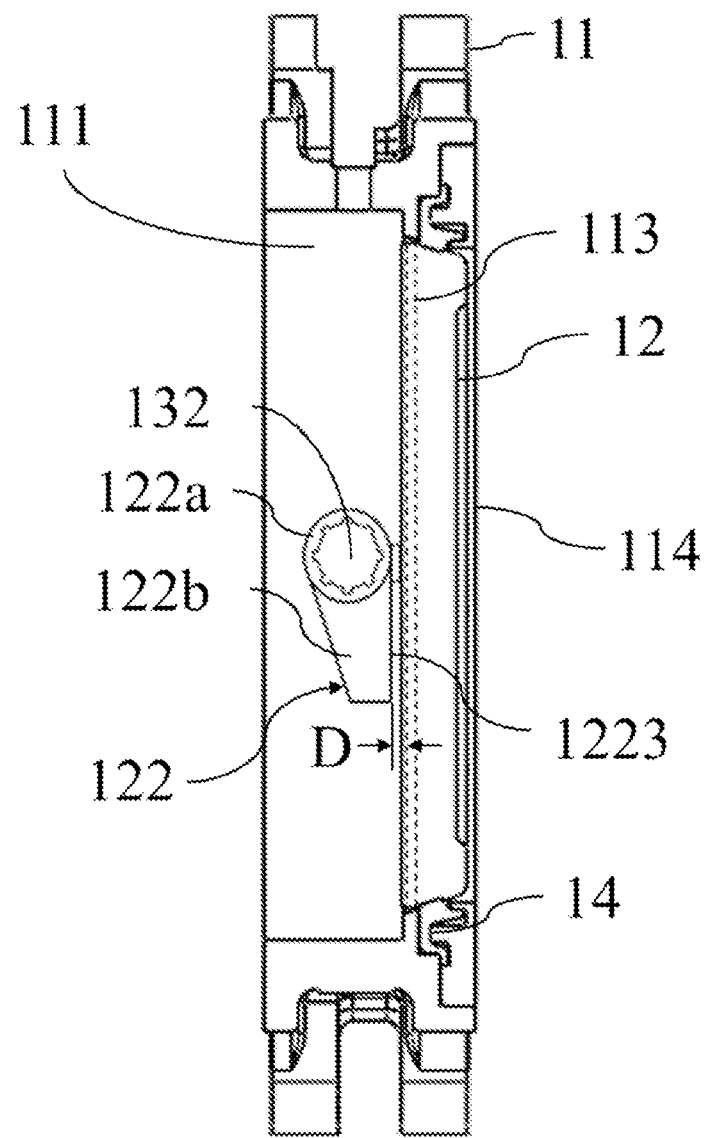
FIG. 3A is a schematic bottom view of the butterfly valve's stopper at a state when the disc just closes the valve chamber according to the first embodiment of the present disclosure.
Figure 3B:
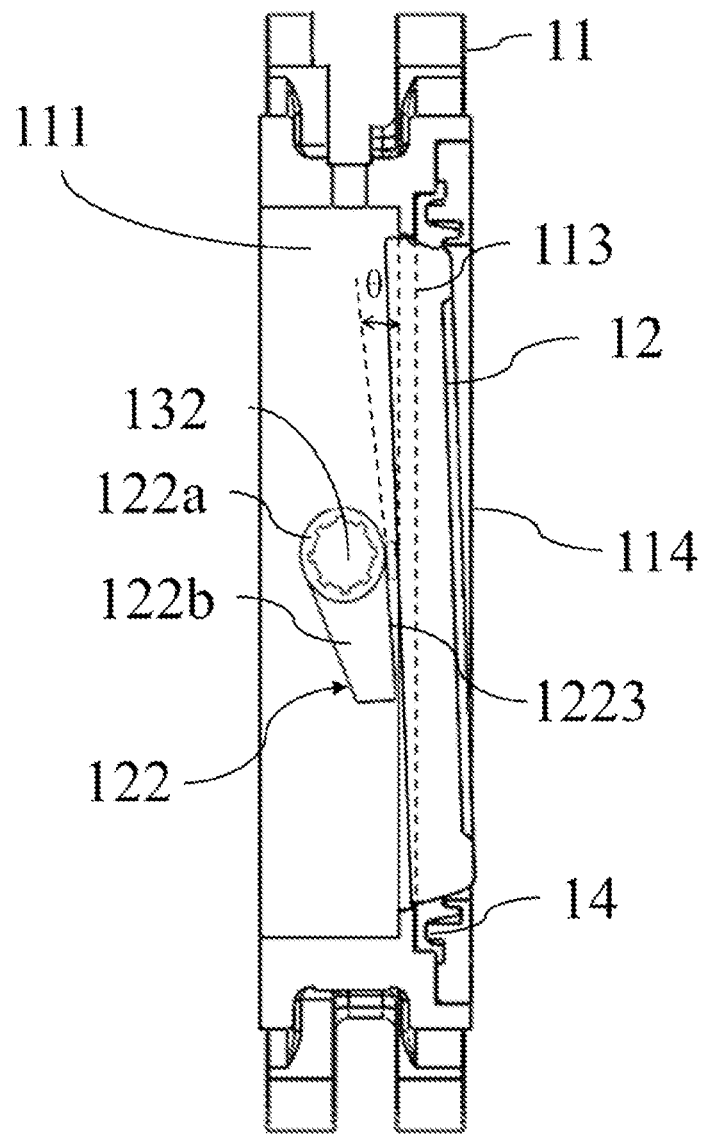
FIG. 3B is a schematic bottom view of the butterfly valve's stopper abutting against the flange according to the first embodiment of the present disclosure.

FIG. 3A is a schematic bottom view of the butterfly valve's stopper at a state when the disc just closes the valve chamber according to a first embodiment of the present disclosure. FIG. 3B is the schematic bottom view of the butterfly valve's stopper abutting against the flange according to the first embodiment of the present disclosure. Referring to FIG. 2A, FIG. 2B, FIG. 2E, FIG. 3A and FIG. 3B, in one embodiment, the stopper 122 has a second engaging portion 122a and a protruding portion 122b extended from a first side, such as the left side in FIG. 2A, of the second engaging portion 122a, and the fourth through hole 1221 is formed inside the second engaging portion 122a, and a surface of flange 113 facing the stopper 122 is flat while a surface 1223 of the protruding portion 122b facing the flange 113 is also entirely flat, and the second engaging portion 122a is away from the flange 113 with an interval D. When the disc 12 just seals the first through hole 111, the axial central line of the disc 12 and the axial central line of the first through hole 111 are in parallel with each other, and the entire surface 1223 of the protruding portion 122b facing the flange 113 is in parallel with the surface of the flange 113 (shown in FIG. 3A). At this time, a part of the surface 1223 of the protruding portion 122b facing the flange 113 is going to contact and abut against the flange 113 to avoid over rotation of the disc 12 when the disc 12 continues to rotate toward the flange 113 with an angle θ (shown in FIG. 3B). The angle θ may range from 0.5 degrees to 1.5 degrees, and the part of the surface 1223 abutting against the flange 113 forms a point contact with the flange 113 i.e. the ridge connecting the surface 1223 and the surface adjoining the surface 1223 abuts against the flange 113. Besides, referring to FIG. 2A and FIG. 2D, a bottom edge 12231 of the surface 1223 is lower than an inner edge 1131 of the flange 113 when the stopper 122 abuts against the flange 113.

Figure 4A:
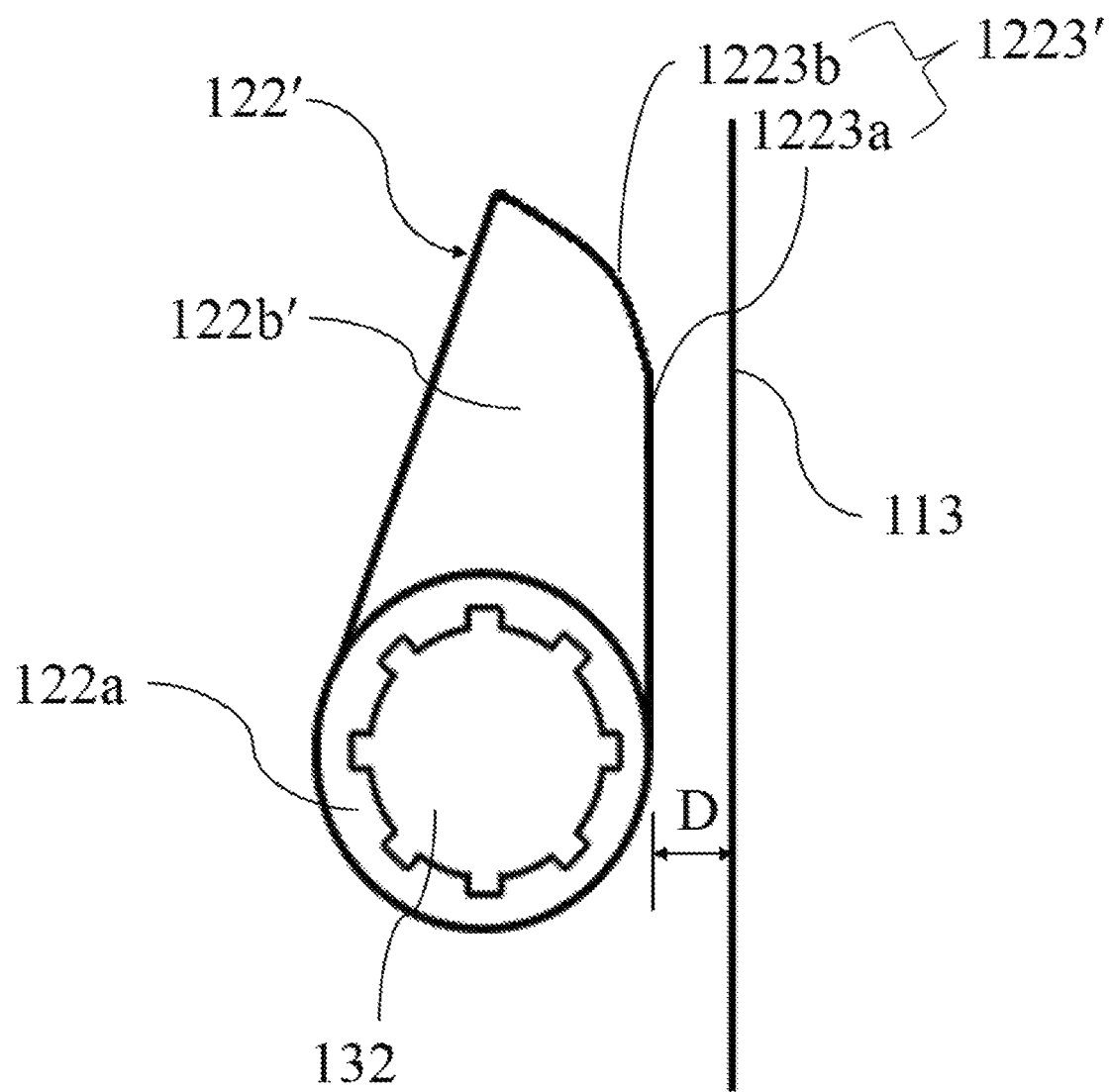
FIG. 4A is an exaggerated schematic top view of the butterfly valve's stopper at a state when the disc just closes the valve chamber according to a second embodiment of the present disclosure, wherein only the stopper and one surface of the flange are shown.
Figure 4B:
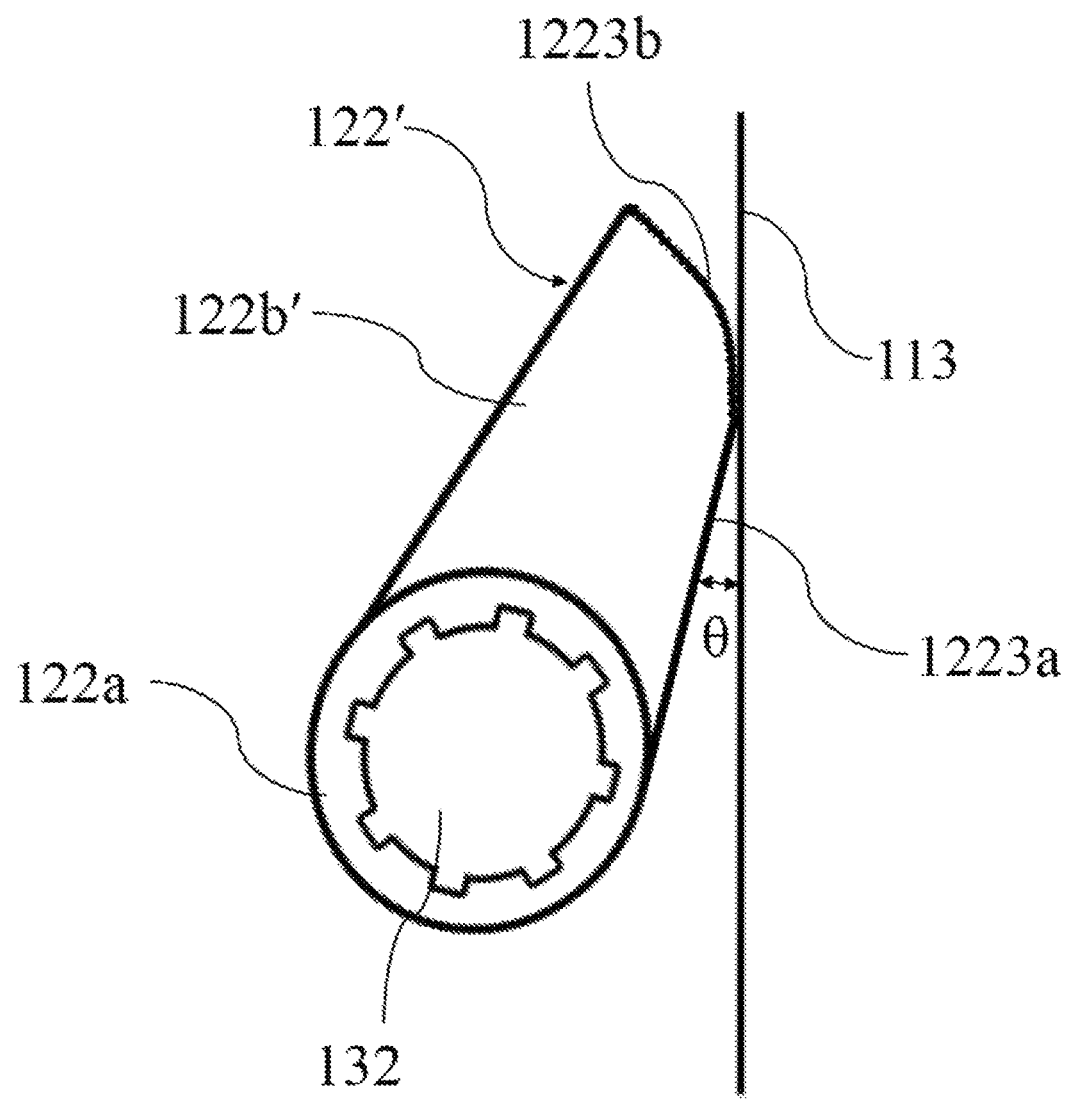
FIG. 4B is an exaggerated schematic top view of the butterfly valve's stopper abutting against the flange according to the second embodiment of the present disclosure, wherein only the stopper and one surface of the flange are shown.

FIG. 4A is an exaggerated schematic top view of the butterfly valve's stopper at a state when the disc just closes the valve chamber according to a second embodiment of the present disclosure, wherein only the stopper and one surface of the flange are shown. FIG. 4B is an exaggerated schematic top view of the butterfly valve's stopper abutting against the flange according to the second embodiment of the present disclosure, wherein only the stopper and one surface of the flange are shown. Referring to FIG. 4A and FIG. 4B, in the second embodiment, the differences between this embodiment and the first embodiment are that, the entire surface 1223' of the protruding portion 122b' of the stopper 122' facing the flange 113 is formed to include a flat portion 1223a and a curved portion 1223b, the curved portion 1223b adjoins the flat portion 1223a, the curved portion 1223b curves toward a direction away from the flange 113, and the second engaging portion 122a is away from the flange 113 with an interval D. When the disc 12 just seals the first through hole 111, the axial central line of the disc 12 and the axial central line of the first through hole 111 are in parallel with each other, and the flat portion 1223a of the protruding portion 122b' is in parallel with the surface of the flange 113 (as shown in FIG. 4A). At this time, the curved portion 1223b of the protruding portion 122b' is going to abut against the flange 113 to avoid over rotation of the disc 12 when the disc 12 continues to rotate toward the flange 113 with an angle θ (shown in FIG. 4B). The angle θ may range from 0.5 degrees to 1.5 degrees, and the curved portion 1223b abutting against the flange 113 forms a surface contact with the flange 113. In another embodiment, the curved portion 1223b forms a flat surface contact with the flange 113.

Figure 5A:
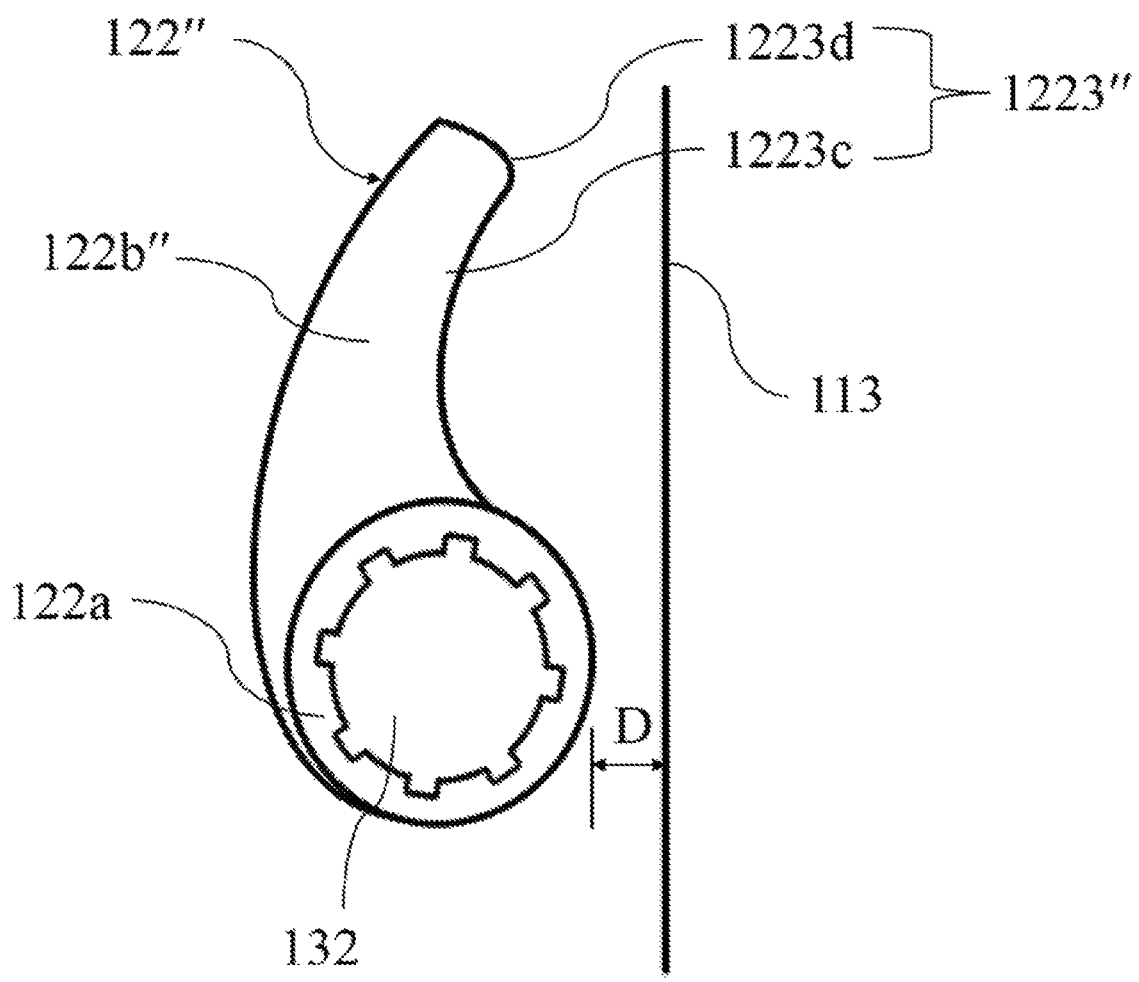
FIG. 5A is an exaggerated schematic top view of the butterfly valve's stopper at a state when the disc just closes the valve chamber according to a third embodiment of the present disclosure, wherein only the stopper and one surface of the flange are shown.
Figure 5B:
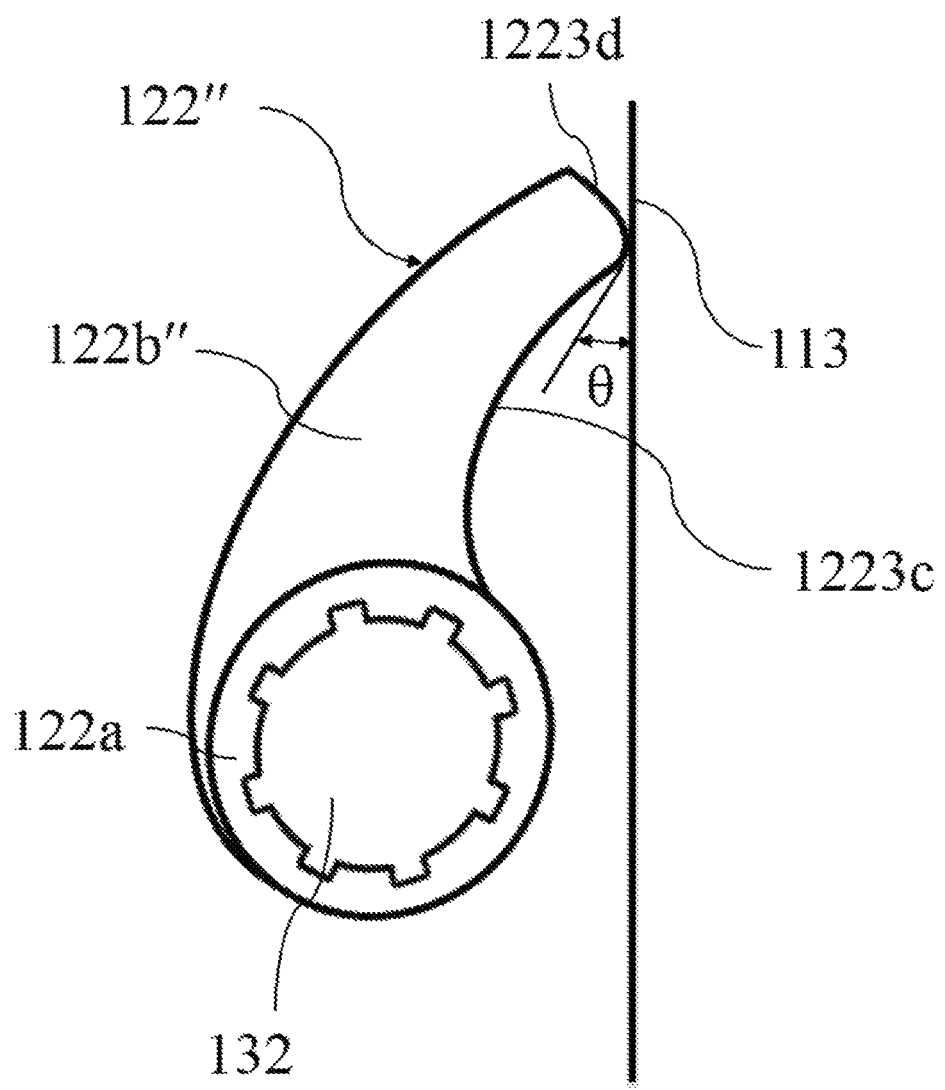
FIG. 5B is an exaggerated schematic top view of the butterfly valve's stopper abutting against the flange according to the third embodiment of the present disclosure, wherein only the stopper and one surface of the flange are shown.

FIG. 5A is an exaggerated schematic top view of the butterfly valve's stopper at a state when the disc just closes the valve chamber according to a third embodiment of the present disclosure, wherein only the stopper and one surface of the flange are shown. FIG. 5B is an exaggerated schematic top view of the butterfly valve's stopper abutting against the flange according to the third embodiment of the present disclosure, wherein only the stopper and one surface of the flange are shown. Referring to FIG. 5A and FIG. 5B, in a third embodiment, the differences between this embodiment and the first embodiment are that, the entire surface 1223" of the protruding portion 122b" of the stopper 122" facing the flange 113 is formed to include a first curved portion 1223c and a second curved portion 1223d, the first curved portion 1223c adjoins the second curved portion 1223d, the first curved portion 1223c is curved toward the flange 113 when the second curved portion 1223d is curved toward a direction away from the flange 113, and the second engaging portion 122a is away from the flange 113 with an interval D. When the disc 12 just seals the first through hole 111, the axial central line of the disc 12 and the axial central line of the first through hole 111 are in parallel with each other, the surface connecting the first curved portion 1223c and the second curved portion 1223d is in parallel with the surface of flange 113 (as shown in FIG. 5A). At this time, the second curved portion 1223d of the protruding portion 122b" is going to abut against the flange 113 to avoid over rotation of the disc 12 when the disc 12 continues to rotate toward the flange 113 with an angle θ (as shown in FIG. 5B). The angle θ may range from 0.5 degrees to 1.5 degrees and the second curved portion 1223d may form a point contact or a surface contact with the flange 113.

Figure 6A:
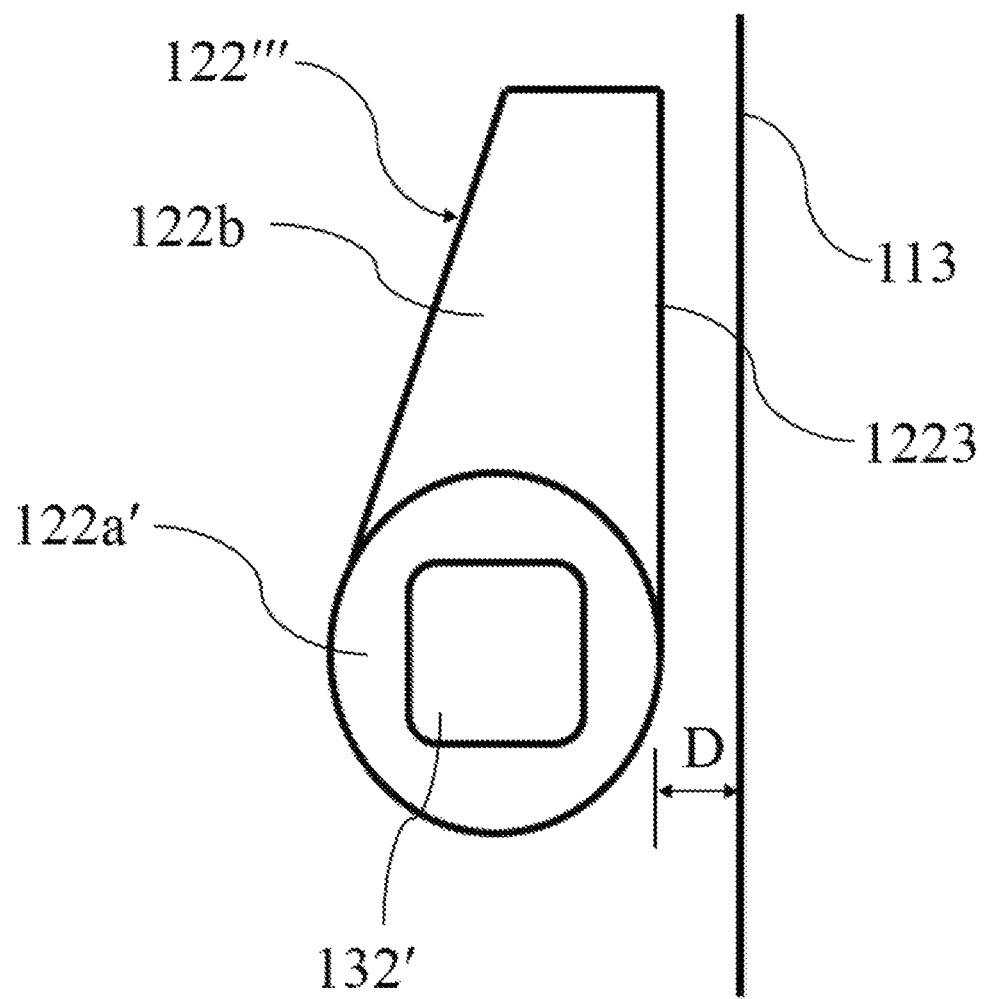
FIG. 6A is an exaggerated schematic top view of the butterfly valve's stopper at a state when the disc just closes the valve chamber according to a fourth embodiment of the present disclosure, wherein only the stopper and one surface of the flange are shown.
Figure 6B:
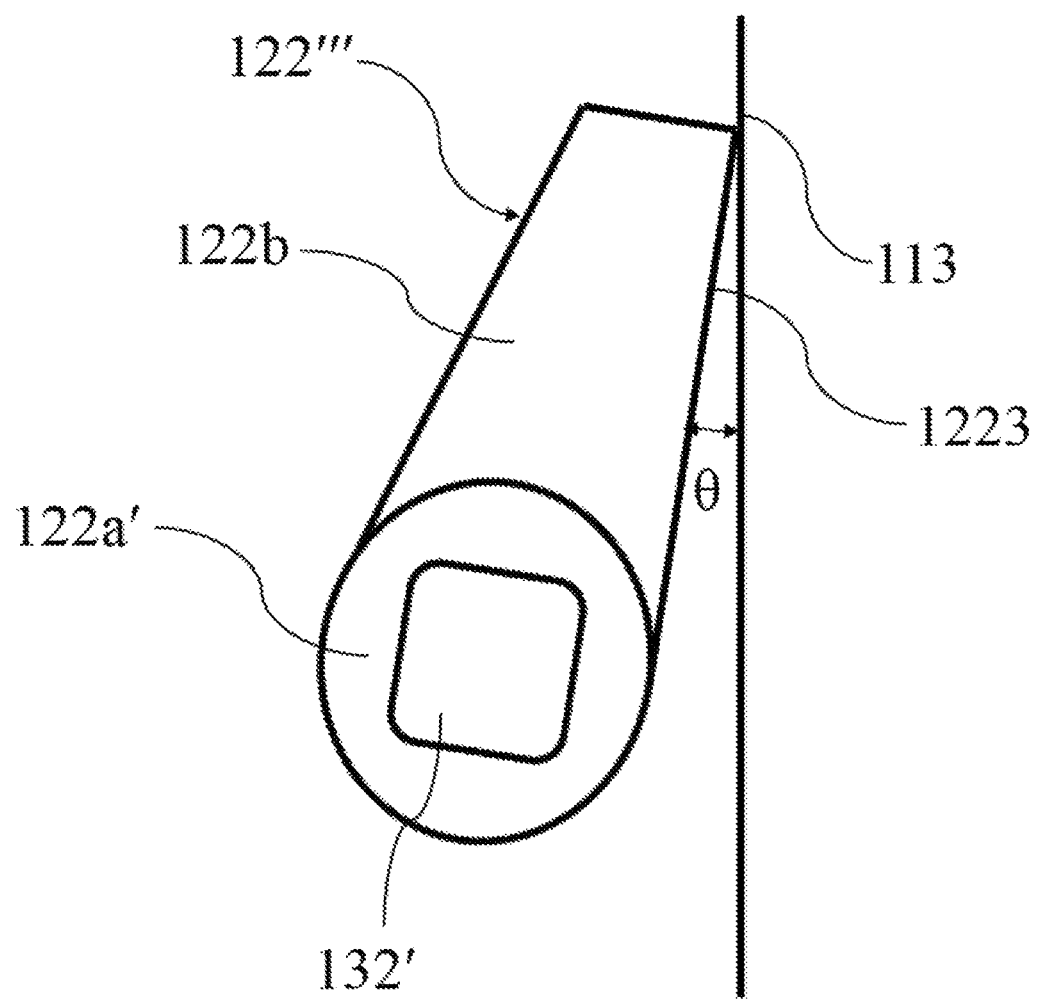
FIG. 6B is an exaggerated schematic top view of the butterfly valve's stopper abutting against the flange according to the fourth embodiment of the present disclosure, wherein only the stopper and one surface of the flange are shown.

FIG. 6A is an exaggerated schematic top view of the butterfly valve's stopper at a state when the disc just closes the valve chamber according to a fourth embodiment of the present disclosure, wherein only the stopper and one surface of the flange are shown. FIG. 6B is an exaggerated schematic top view of the butterfly valve's stopper abutting against the flange according to the fourth embodiment of the present disclosure, wherein only the stopper and one surface of the flange are shown. Referring to FIG. 6A and FIG. 6B, in the fourth embodiment, the stopper 122''' abuts against the flange 113 in the same way as that in the first embodiment, and the related details won't be repeated here. The differences between this embodiment and the first embodiment are that, the second engagement portion 122a' of the stopper 122''' and the second part 132' of the stem 13 have an identical rectangle cross-section profile, such as a square. When the second part 132' of the stem 13 and the second engaging portion 122a' are engaged with each other in this way, the stopper 122''' moves together with the stem 13. In a variation to this embodiment, the entire surface 1223 of the protruding portion 122b facing the flange 113 can also be formed to include the flat portion 1223a and the curved portion 1223b as shown in FIG. 4A and therefore abut against the flange 113 in the same way as shown in FIG. 4B. Alternatively, the entire surface 1223 of the protruding portion 122b facing the flange 113 can also be formed to include the first curved portion 1223c and the second curved portion 1223d as shown in FIG. 5A and therefore abut against the flange 113 in the same way as shown in FIG. 5B.

Figure 7A:
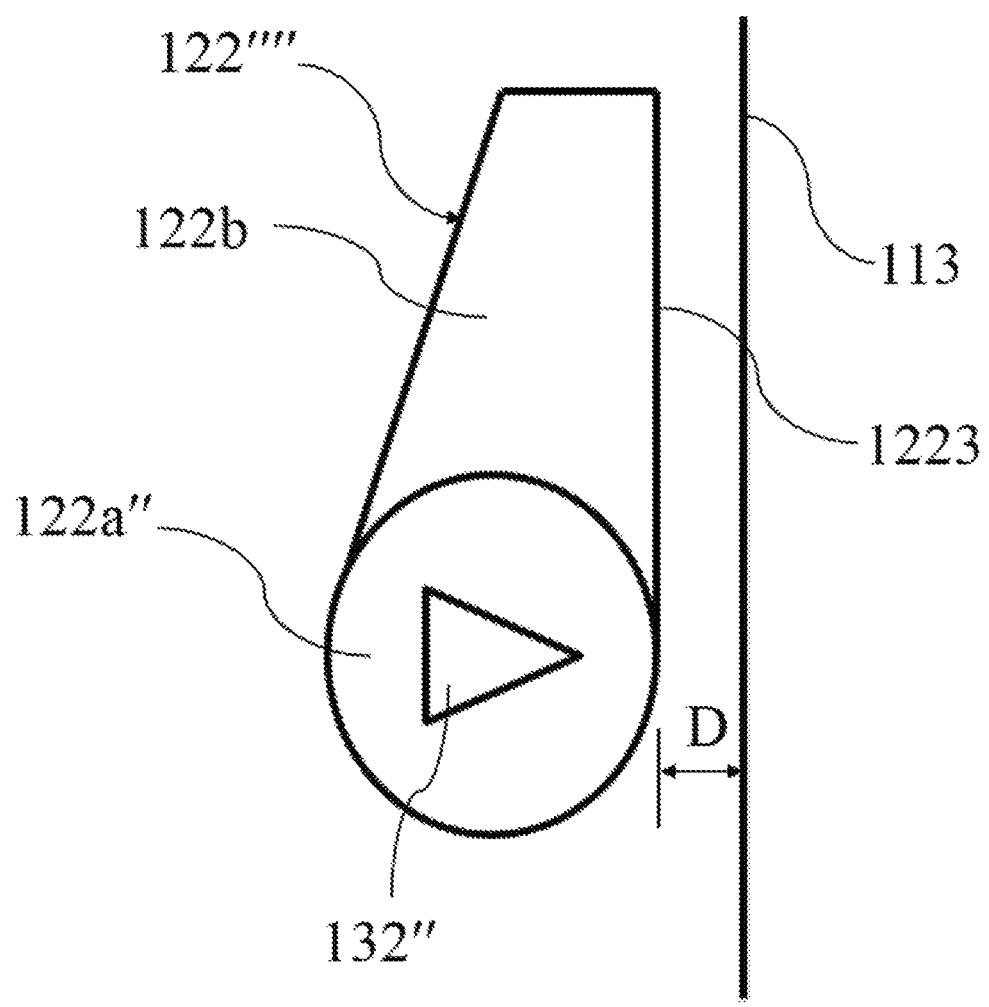
FIG. 7A is an exaggerated schematic top view of the butterfly valve's stopper at a state when the disc just closes the valve chamber according to a fifth embodiment of the present disclosure, wherein only the stopper and one surface of the flange are shown.
Figure 7B:
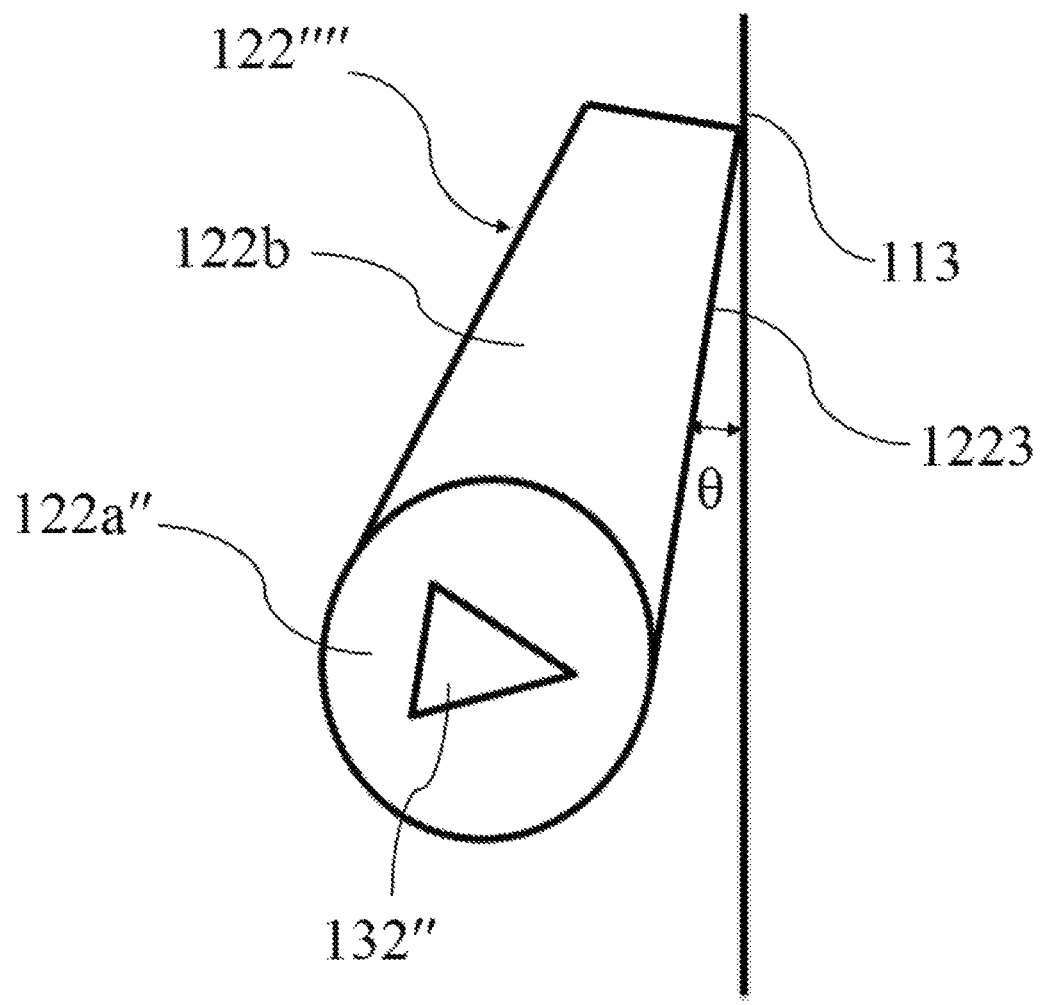
FIG. 7B is an exaggerated schematic top view of the butterfly valve's stopper abutting against the flange according to the fifth embodiment of the present disclosure, wherein only the stopper and one surface of the flange are shown.

FIG. 7A is an exaggerated schematic top view of the butterfly valve's stopper at a state when the disc just closes the valve chamber according to a fifth embodiment of the present disclosure, wherein only the stopper and one surface of the flange are shown. FIG. 7B is an exaggerated schematic top view of the butterfly valve's stopper abutting against the flange according to the fifth embodiment of the present disclosure, wherein only the stopper and one surface of the flange are shown. Referring to FIG. 7A and FIG. 7B, in the fifth embodiment, the stopper 122'''' abuts against the flange 113 in the same way as that in the first embodiment and the related details won't be repeated herein. The differences between this embodiment and the first embodiment are that, the second engaging portion 122a'' of the stopper 122'''' and the second part 132'' of the stem 13 have an identically triangle cross-section profile. When the second part 132 of the stem 13 and the second engaging portion 122a'' are engaged with each other in this way, the stopper 122'''' moves together with the stem 13. In a variation of this embodiment, the entire surface 1223 of the protruding portion 122b facing the flange 113 can be formed to include the flat portion 1223a and the curved portion 1223b as shown in FIG. 4A and therefore abut against the flange 113 in the same way as shown in FIG. 4B. Alternatively, the entire surface 1223 of the protruding portion 122b facing the flange 113 can also be formed to include the first curved portion 1223c and the second curved portion 1223d as shown in FIG. 5A and therefore abut against the flange 113 in the same way as shown in FIG. 5B.

Figure 8A:
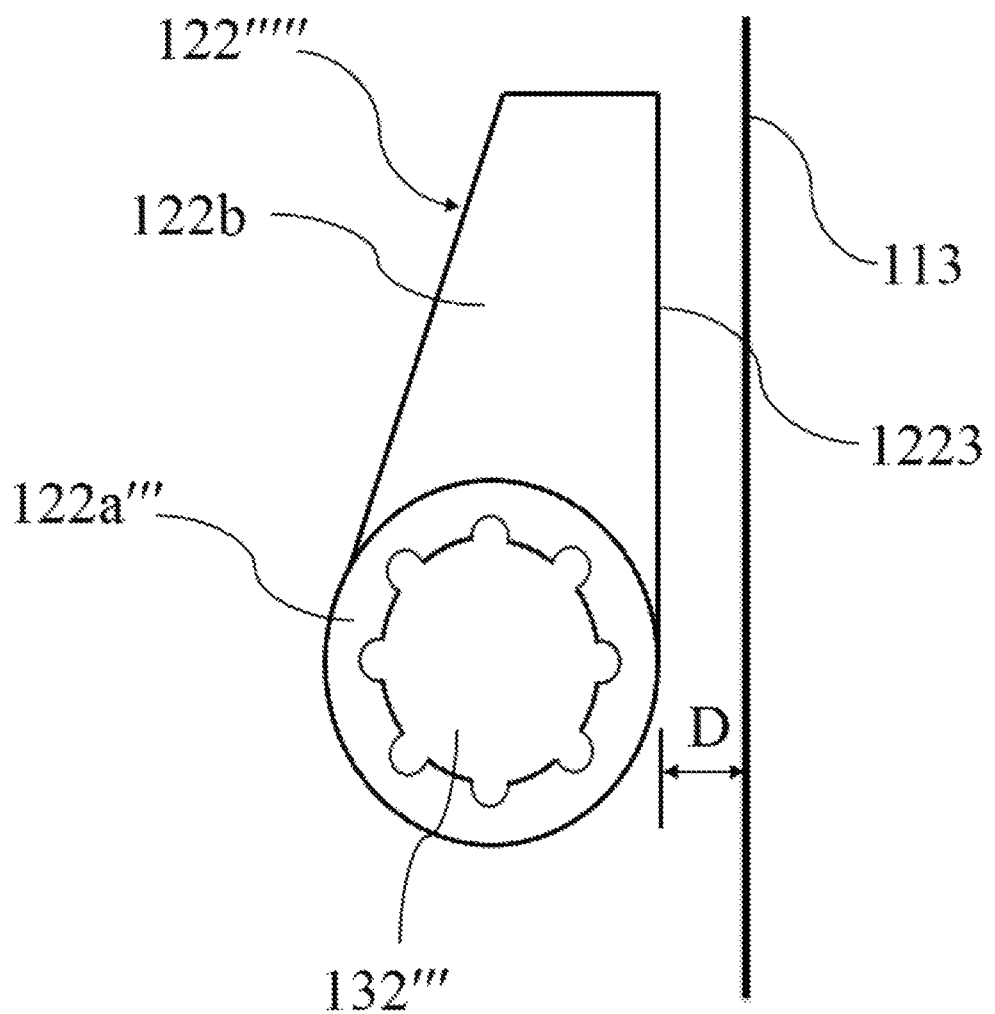
FIG. 8A is an exaggerated schematic top view of the butterfly valve's stopper at a state when the disc just closes the valve chamber according to a sixth embodiment of the present disclosure, wherein only the stopper and one surface of the flange are shown.
Figure 8B:
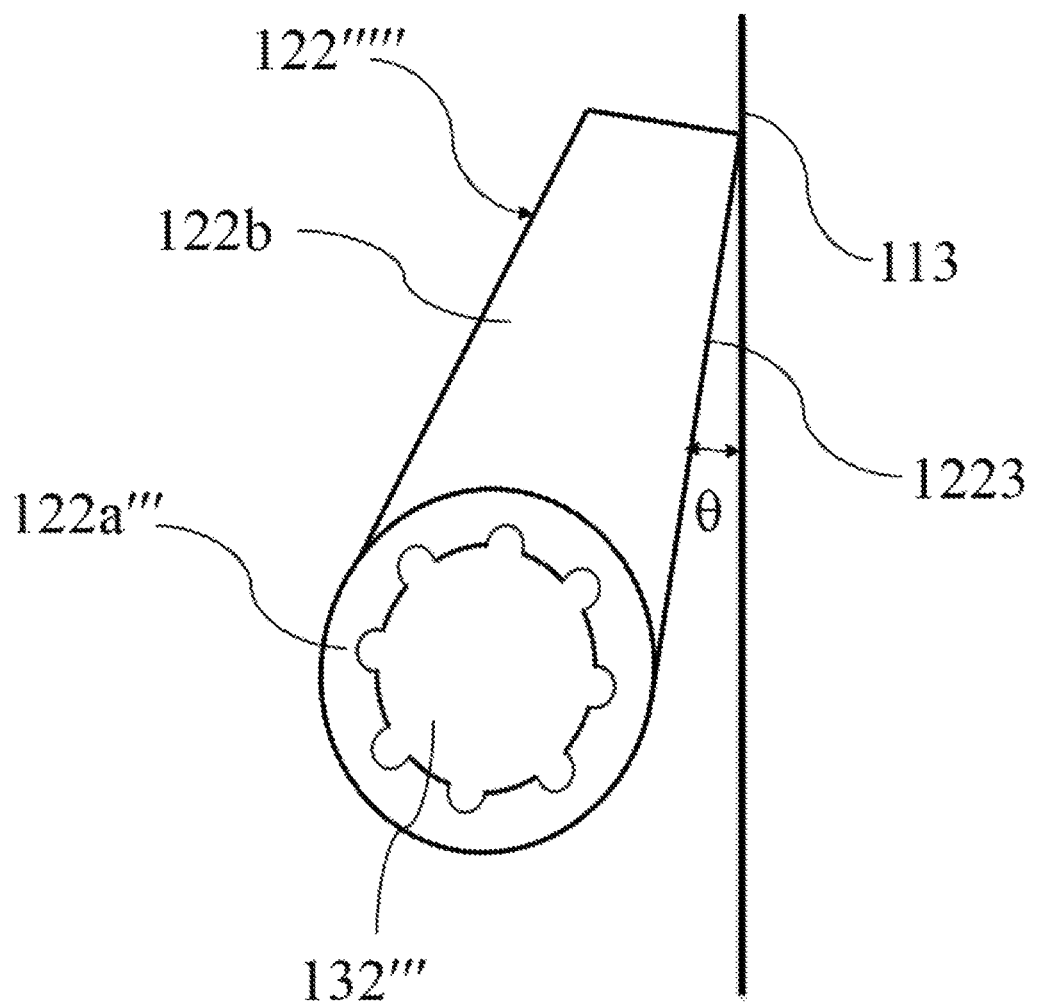
FIG. 8B is an exaggerated schematic top view of the butterfly valve's stopper abutting against the flange according to the sixth embodiment of the present disclosure, wherein only the stopper and one surface of the flange are shown.

FIG. 8A is an exaggerated schematic top view of the butterfly valve's stopper at a state when the disc just closes the valve chamber according to a sixth embodiment of the present disclosure, wherein only the stopper and one surface of the flange are shown. FIG. 8B is an exaggerated schematic top view of the butterfly valve's stopper abutting against the flange according to the sixth embodiment of the present disclosure, wherein only the stopper and one surface of the flange are shown. Referring to FIG. 8A and FIG. 8B, in the sixth embodiment, the stopper 122''''' abuts against the flange 113 in the same way as that in the first embodiment and the related details won't be repeated herein. The differences between this embodiment and the first embodiment are that, the second engaging portion 122a''' of the stopper 122''''' and the second part 132''' of the stem 13 have an identically round-corner petal cross-section profile. When the second part 132''' of the stem 13 and the second engaging portion 122a''' are engaged with each other in this way, the stopper 122''''' moves together with the stem 13. In a variation of this embodiment, the entire surface 1223 of the protruding portion 122b facing the flange 113 can be formed to include the flat portion 1223a and the curved portion 1223b as shown in FIG. 4A and therefore abut against the flange 113 in the same way as shown in FIG. 4B. Alternatively, the entire surface 1223 of the protruding portion 122b facing the flange 113 can also be formed to include the first curved portion 1223c and the second curved portion 1223d as shown in FIG. 5A and therefore abut against flange 113 in the same way as shown in FIG. 5B.

Figure 9:
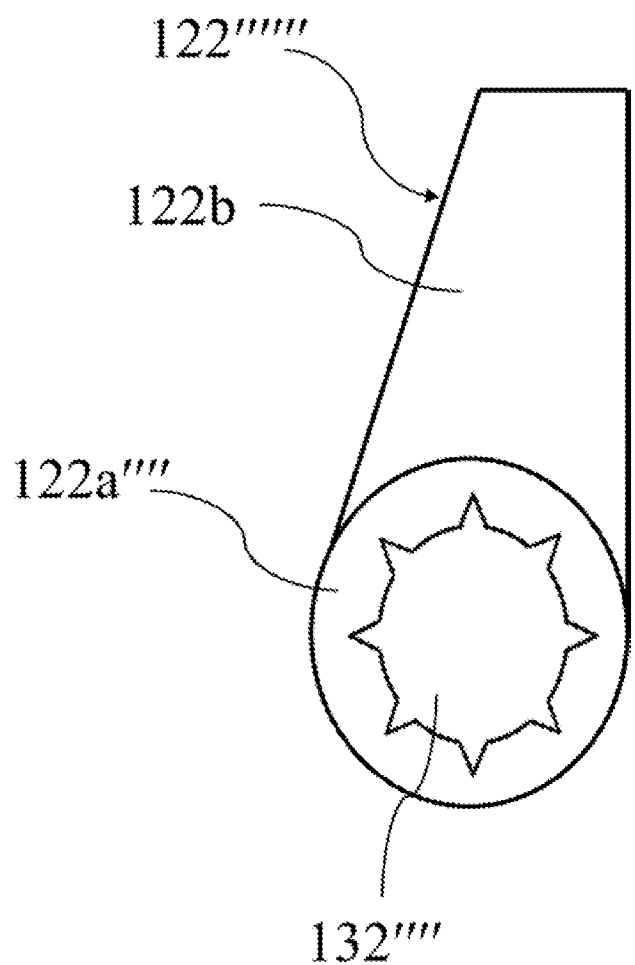
FIG. 9 is a schematic top view of the butterfly valve's stopper according to the seventh embodiment of the present disclosure.

FIG. 9 is a schematic top view of the butterfly valve's stopper according to the seventh embodiment of the present disclosure. Referring to FIG. 9, in the seventh embodiment, the differences between this embodiment and the sixth embodiment are that, the second engaging portion 122a'''' of the stopper 122'''''' and the second part 132'''' of the stem 13 have an identically sharp-corner petal cross-section profile. When the second part 132'''' of the stem 13 and the second engaging portion 122a'''' are engaged with each other in this way, the stopper 122'''''' moves together with the stem 13. In this embodiment, the way in which the protruding portion 122b abuts against the flange 113 is the same as that mentioned in the above embodiments and will not be repeated herein.

Figure 10:
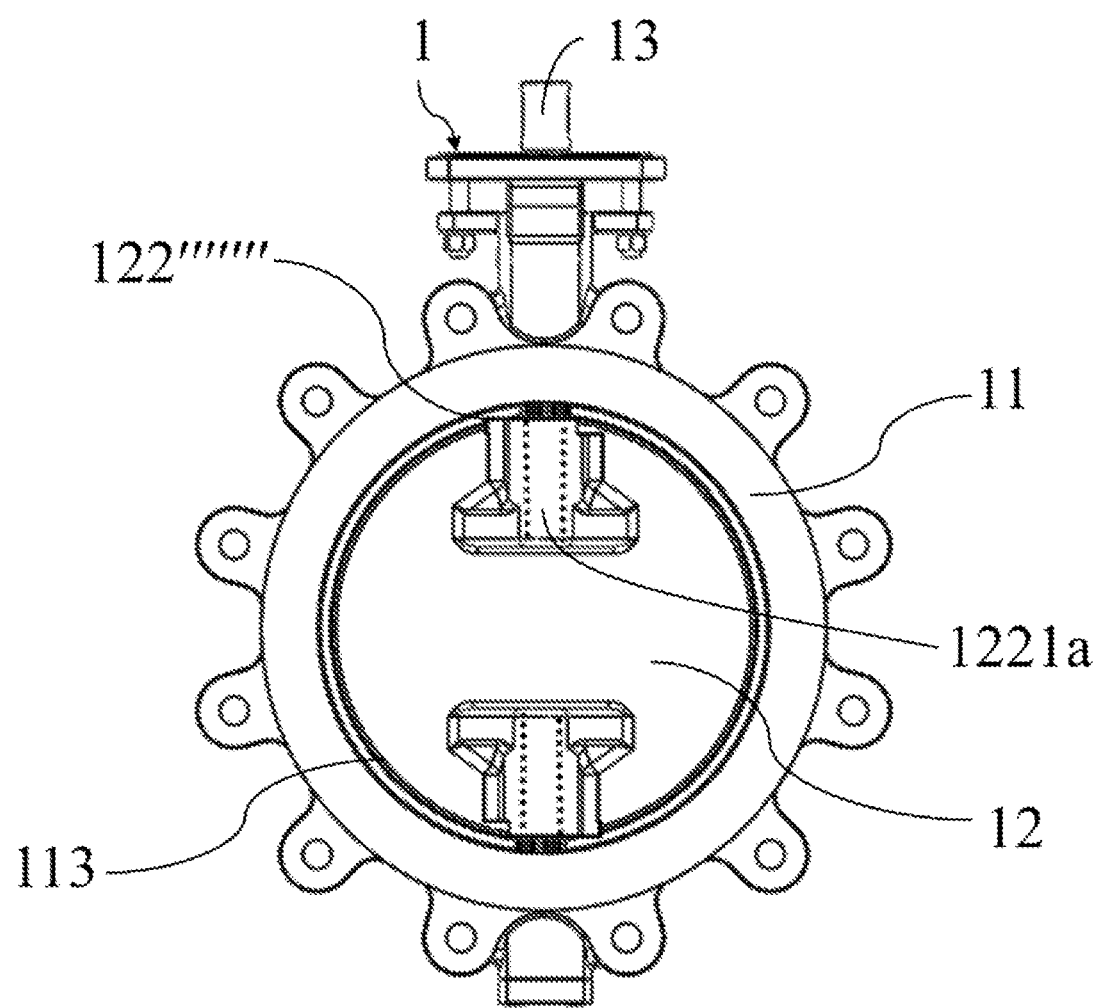
FIG. 10 is a rear view schematically showing the butterfly valve including only the valve body, the disc, the stem, and the stopper according to an eighth embodiment of the present disclosure.

FIG. 10 is a rear view schematically showing the butterfly valve including only the valve body, the disc, the stem, and the stopper according to an eighth embodiment of the present disclosure. As shown in FIG. 10, in one embodiment, the stopper 122''''''' is one-piece formed with the disc 12 and the second engaging portion 122a of the stopper 122''''''' and the first engaging portion 121 of the stopper 122''''''' of the disc 12 are formed into a one-piece. Meanwhile, the third through hole 1211 and the fourth through hole 1221 are integrated into a fifth through hole 1221a. In addition, two stoppers 122''''''' are respectively disposed on an upper end and a lower end of the disc 12 to be adjacent to the flange 113 and in a passing route of the stem 13 to separately abut against the upper end and lower end of the flange 113 in order to enforce the stopping of the over rotation of the disc 12 after a completely sealing state of the disc 12 is reached. Therefore, the rotation of the stem 13 will lead two stoppers 122''''''' to move together with the disc 12 and force the stoppers 122''''''' to separately abut against the upper end and lower end of the flange 113 when the disc 12 over rotates after reaching the completely sealing state.

In each embodiment of the present disclosure, the minimum amount for the stoppers 122, 122', 122'', 122''', 122'''', 122''''', 122'''''', or 122''''''' is at least one. The cross-sectional profile of the stoppers can be one as shown in FIG. 3A to FIG. 9 or designed according to actual demand and is not limited herein as long as the stoppers abuts against the flange 113 and the stopping effects when the disc 12 in the butterfly valve 1 tends to over rotate.

Summing up the above, the considerate design of the present disclosure meets practical requirements. The present disclosure cures the deficiencies of existing butterfly valves and is significantly advantageous over conventional techniques. Accordingly, the present disclosure produces an improved effect and cannot be easily accomplished.

The detailed description set forth above is a specific illustration for preferred embodiments of the present disclosure. However, these embodiments are not intended to limit the scope of the present disclosure, and equivalents or modifications which do not depart from the spirit of the present disclosure should also be included in the scope of the present disclosure.

What is claimed is:
1. A butterfly valve, comprising:
a valve body formed with a first through hole, a second through hole, and a flange; an axial central line of the second through hole and an axial central line of the first through hole being perpendicular to each other; the flange radially extending from a surface surrounding the first through hole and extending into the first through hole;
a rotatable disc pivoted at an open end of the first through hole to close the open end when an axial central line of the disc being in parallel with the axial central line of the first through hole;
a stem accommodated inside the second through hole and embedded in a first engaging portion formed on a surface of the disc to drive the disc to rotate; and
a stopper formed with a second engaging portion to be embedded with the stem near the flange, the stopper being rotated by the stem and abutting against the flange when the disc closes the open end and continues to rotate.

2. The butterfly valve of claim 1, wherein the second engaging portion and the stem have an identical cross-section profile.

3. The butterfly valve of claim 2, wherein the cross-section profile of the second engaging portion is formed to have a shape of one selected from a group consisting of a triangle, a rectangle, a curved sawtooth, and a petal.

4. The butterfly valve of claim 1, wherein the stopper abuts against the flange with a curved or flat surface.

5. The butterfly valve of claim 1, wherein the stopper abuts against the flange with a ridge.

6. The butterfly valve of claim 1, wherein the stopper abuts against the flange with a portion having a bottom edge being lower than an inner edge of the flange.

7. The butterfly valve of claim 1, wherein the stopper and the disc are one-piece formed.

8. The butterfly valve of claim 1, wherein the stopper abuts against the flange when the disc closes the open end and continues to rotate with an angle ranging from 0.5 degrees to 1.5 degrees.

9. The butterfly valve of claim 1, wherein the stopper has a protruding portion formed on one side of the second engaging portion and the protruding portion abuts against the flange when the disc closes the open end and continues to rotate.

10. A butterfly valve, comprising:
   a valve body formed with a first through hole, a second through hole, and a flange; an axial central line of the second through hole and an axial central line of the first through hole being perpendicular to each other; the flange radially extending from a surface surrounding the first through hole and extending into the first through hole;
   a stem being accommodated inside the second through hole and extending into the first through hole;
   a disc having a first engaging portion formed on a surface opposite an open end of the first through hole, the first engaging portion being embedded with a first part of the stem, the disc being rotated at the open end of the first through hole by the stem and closing the open end when an axial central line of the disc being in parallel with the axial central line of the first through hole; and
   a stopper having a second engaging portion and a protruding portion extending from one side of the second engaging portion, the second engaging portion being embedded with a second part of the stem near the flange, the stopper being rotated by the stem and the protruding portion abutting against the flange when the disc continues to rotate toward the flange with an angle ranging from 0.5 degrees to 1.5 degrees from a state in which the axial central line of the disc being in parallel with the axial central line of the first through hole.

11. The butterfly valve of claim 10, wherein the first engaging portion is formed with a third through hole and an axial central line of the third through hole coincides with the axial central line of the second through hole.

12. The butterfly valve of claim 11, wherein the second engaging portion is formed with a fourth through hole and an axial central line of the fourth through hole coincides with the axial central line of the third through hole.

13. The butterfly valve of claim 10, wherein the second engaging portion and the second part of the stem have an identical cross-section profile.

14. The butterfly valve of claim 13, wherein the cross-section profile of the second engaging portion is formed to have a shape of one selected from a group consisting of a triangle, a rectangle, a curved sawtooth, and a petal.

15. The butterfly valve of claim 10, wherein the second engaging portion and the first engaging portion have an identical cross-section profile.

16. The butterfly valve of claim 10, wherein a surface of the protruding portion facing the flange is entirely flat and contacts the flange once the protruding portion abuts against the flange.

17. The butterfly valve of claim 16, wherein a bottom edge of the entirely flat surface is lower than an inner edge of the flange.

18. The butterfly valve of claim 10, wherein a surface of the protruding portion facing the flange includes a curved portion and only the curved portion contacts the flange once the protruding portion abuts against the flange.

19. The butterfly valve of claim 18, wherein a bottom edge of the curved portion is lower than an inner edge of the flange.

20. The butterfly valve of claim 10, wherein the stopper and the disc are one-piece formed and the second engaging portion and the first engaging portion are one-piece formed.

* * * * *